H. W. BEECHER.
MOTOR CAR PROTECTOR.
APPLICATION FILED JUNE 22, 1915.
1,173,084.
Patented Feb. 22, 1916.
2 SHEETS—SHEET 1.
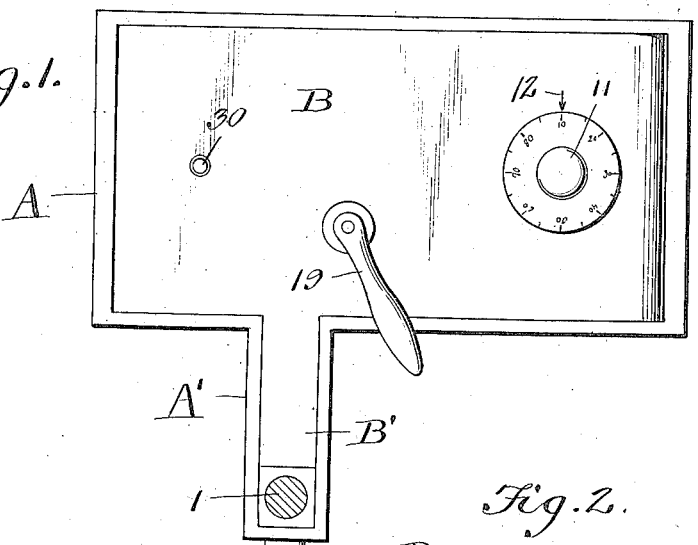
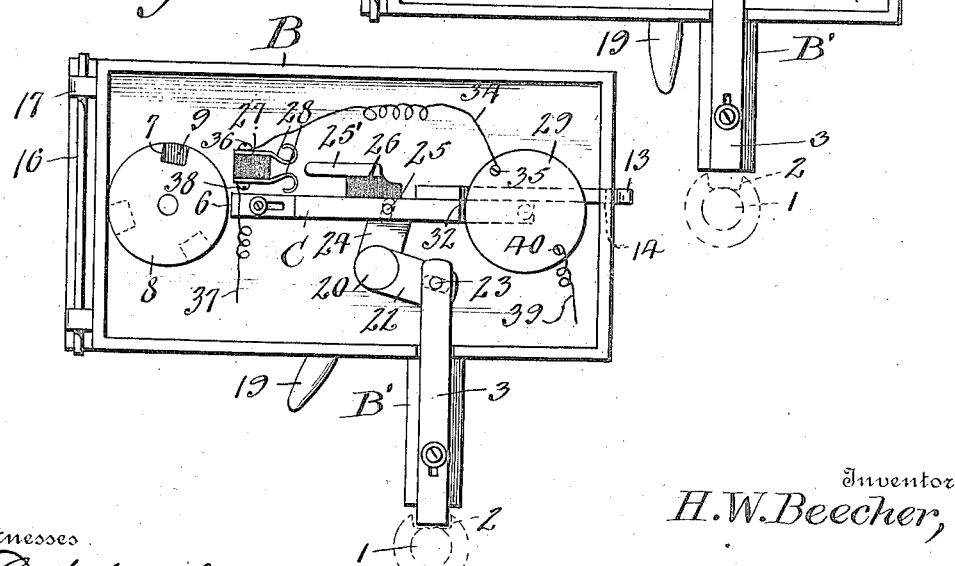
Witnesses
Inventor
H. W. Beecher,
By Victor J. Evans
Attorney

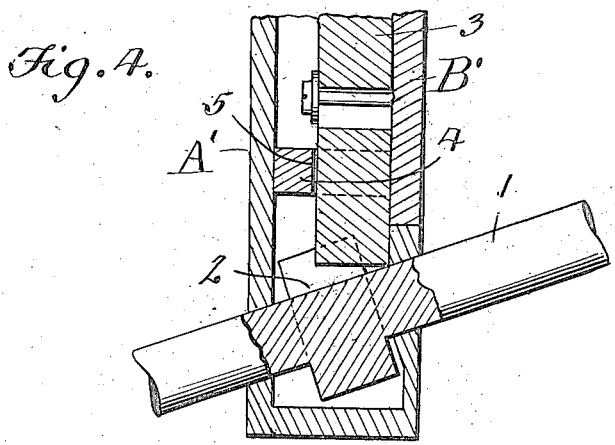
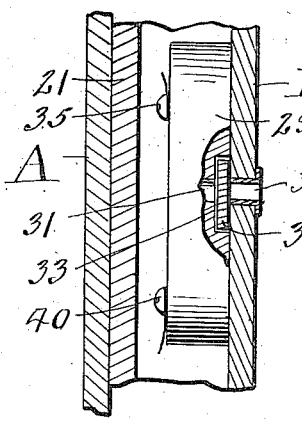
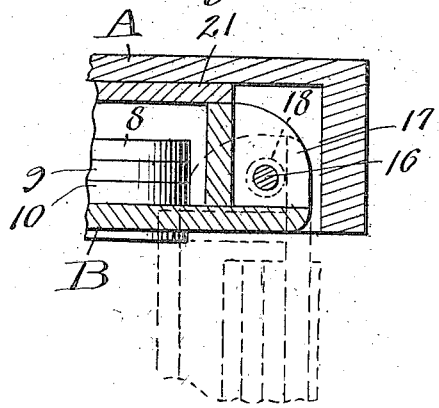
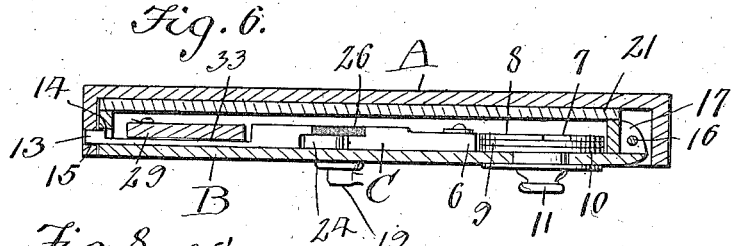
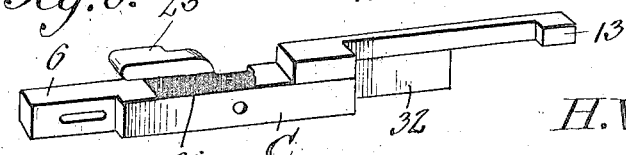

UNITED STATES PATENT OFFICE.

HENRY W. BEECHER, OF MAKANDA, ILLINOIS.

MOTOR-CAR PROTECTOR.

1,173,084.   Specification of Letters Patent.   Patented Feb. 22, 1916.

Application filed June 22, 1915. Serial No. 35,600.

*To all whom it may concern:*

Be it known that I, HENRY W. BEECHER, a citizen of the United States, residing at Makanda, in the county of Jackson and State of Illinois, have invented new and useful Improvements in Motor-Car Protectors, of which the following is a specification.

This invention relates to motor car protectors or devices for preventing unauthorized persons from starting and operating a motor car or the like, the invention hereinafter described providing for opening the switch of the ignition system, preventing the insertion of a plug or key in the electric starting switch, and also locking the steering mechanism, the several elements being combined in a novel manner and being locked under the conditions above specified, thus protecting the car against theft and use by any one except the owner or authorized operator thereof.

With the above and other objects in view, the invention consists in the novel construction, combination and arrangement of parts, as herein described, illustrated and claimed.

In the accompanying drawings:—Figure 1 is a face view of the casing and switch board. Fig. 2 is an inner face view of the switch board, showing the switch closed. Fig. 3 is a similar view showing the switch open. Fig. 4 is a vertical section showing the steering shaft locked. Fig. 5 is a fragmentary section illustrating the key hole shutter. Fig. 6 is a fragmentary horizontal section illustrating the switch board locking means. Fig. 7 is a fragmentary section illustrating the concealed hinge. Fig. 8 is a perspective view of the locking bolt and shutter.

Referring to the drawings A generally designates a casing adapted to be secured to the car above the steering column, the said casing being substantially rectangular in shape and of sufficient depth to receive and hold the switch board designated generally at B, which switch board is hinged to the casing at one end and adapted to be locked to and within said casing at the other or free end of said switch board.

The casing A is provided with a pendent extension A′ through the lower end of which passes the steering shaft 1 which in carrying out the present invention is provided with a square shoulder 2 against which the latch bar hereinafter described is adapted to be forced to prevent said shaft 1 from being turned. The square or flat shoulder 2 of the steering shaft 1 is preferably located in such position that it coöperates with the latch bar when the steering wheels have been turned to the right or to the left as may be preferred and as far as they will go, the object being to prevent the machine from either being driven under its own power to a distant point or being drawn by another vehicle or other power, it being evident that with the steering wheels turned as far as they will go either to the right or to the left, the machine will travel in a circular course.

The switch board B is provided with a pendent extension B′ which forms a closure for the adjacent side of the extension A′ of the casing A. The extension B′ also serves as a support for the latch bar shown at 3, said latch bar being shown as passing through the guide 4 having a guide slot 5. Mounted upon the inner face of the switch board B is a slidable bolt designated generally at C, one end thereof indicated at 6 being adapted to enter the notches 7 of a series of concentric tumblers 8, 9 and 10 forming a permutation lock, said lock being operable by means of a knob 11 on the face of the switch board B being provided with a mark or pointer 12 to enable the several tumblers to be brought into such position relatively to each other that the notches 7 thereof will register to permit the bolt C to be slid longitudinally until the end 6 thereof is received in said notches 7.

At its opposite end the locking bolt C is provided with an extension 13 which projects through an opening 14 in the adjacent end of the switch board so as to engage a hole or keeper 15 in the casing A for the purpose of locking the switch board to the casing. At its opposite end the switch board is provided with a concealed hinge formed by a hinge rod 16 passing through lugs 17 at the same end of the switch board, the extremities of said rod being received in bearing openings 18 in the casing A. This forms a concealed or invisible hinge and prevents the surreptitious opening of the switch board to give access to the mechanism contained upon the inner face thereof.

19 designates a handle or lever having a fixed relation to a rock shaft 20 which is journaled in bearings in the switch board B and also in a back cover 21 which serves as a closure for the back of the switch board to prevent tampering with the mechanism thereon. The shaft 20 is provided with two arms, the arm 22 having a pin and slot connection with the latch bar 3 at the point 23. The other arm 24 of the shaft 20 has a pin and slot connection at 25 with the slidable bolt C. Therefore, when the handle 19 is turned, the bolt C and the latch bar 3 are simultaneously moved in the direction of their length for a purpose which will hereinafter appear.

The bolt C carries one member 25' of an ignition switch or, in other words, a switch which controls the ignition current by means of which the car is operated. The switch member 25' is insulated from the bolt C by means of an interposed block 26 of non-conducting material, the member 25' acting merely as a bridge for the other member of the switch. A stationary member of the switch comprises an insulating block 27 provided with two spring contact fingers 28 between which the member 25' is adapted to be thrust when the bolt C is moved in one direction.

29 designates an electric starter switch which is secured to the inner face of the switch board B, the switch board being formed with an opening 30 for the insertion of a key or plug and the switch itself being formed with a key hole 31 to receive said key. Between the holes 30 and 31 there is arranged a slidable shutter 32 which is carried by the bolt C and which may consist of an integral longitudinal extension of said bolt, said extension or shutter 32 sliding through a guide way 33 in the body of the switch 29. The shutter 32 is thus adapted to form a bar to the entrance or insertion of a key or plug to connect the terminals of the switch 29. A wire 34 extends from a binding post 35 of the switch 29 to a binding post 36 in electrical contact with one of the spring contact fingers 28. Another wire 37 extends from a binding post 38 on the other contact finger 28 to the battery or coil, and another wire 39 extends from a binding post 40 of the switch 29 to the battery or coil.

From the foregoing description taken in connection with the accompanying drawings it will now be understood that when the end 6 of the bolt C occupies the notches 7 of the tumblers 8 of the locking mechanism, the member 25 of the ignition switch bridges the spring contact fingers 28, permitting the current to flow to the igniters or spark plugs of the engine. At the same time the shutter 32 is moved so as to not obstruct the key hole of the switch 29 thereby permitting the usual key or plug to be inserted therein in order to operate the electric starter. In the position of the bolt C just described, the latch bar 3 is withdrawn from its engagement with the steering shaft thereby freeing the steering apparatus.

In order to render the protector or locking mechanism operative, the operator moves the key from the switch 29, and then by means of the handle 19 moves the bolt C toward the switch 29 thereby withdrawing the extremity 6 of the bolt from engagement with the locking mechanism, shifting the shutter 32 so as to bar the entrance to the switch 29, and also forces the latch bolt 3 downwardly until it engages the shoulder 2 on the steering shaft, said shaft having been previously turned to the extreme limit of its movement in the proper direction. The locking mechanism is then operated so as to throw the notches 7 of the tumblers out of registry with each other and this prevents the bolt C from being moved by an unauthorized person to the opposite limit of the position just previously described. Only a person familiar with the manipulation of the locking mechanism can therefore position the tumblers so as to permit the bolt C to be moved in a direction which will unlock the steering mechanism of the machine, unbarring the entrance or key hole to the switch 29 and close the ignition switch by a corresponding shifting movement of the member 25 of said switch to a position where it will electrically bridge the spring contact fingers 28. It will also be noted that when the bolt C is held against sliding movement by the tumblers of the lock, the extension 13 of the bolt will be in engagement with the keeper 15 of the case, thereby preventing the case from being opened by swinging the switch board outwardly on its hinged connection with said case. In case an electric starter is not used on the machine, the switch 29 may be dispensed with and the ignition wires arranged and connected up accordingly in the usual way.

What I claim is:—

1. The combination of a casing, a steering gear latch bar, a locking bolt, manually operable means for simultaneously actuating said latch bar and bolt, an electric ignition switch opened and closed by the sliding of said bolt, one of the switch members being actuated by said bolt, lock mechanism for permitting and preventing the movement of said locking bolt, a second electric switch embodying a key hole and an insertible key, and means on said bolt forming a shiftable closure for said key hole.

2. The combination of a casing, a switch board forming one face of said casing, a locking bolt, manually operable means for sliding said bolt, an electric switch opened and closed by the sliding of said bolt, one of the switch members being actuated by said bolt, lock mechanism for permitting and preventing the movement of said slidable locking bolt, a second electric switch embodying a key hole and an insertible key, and a shutter for said key hole shiftable simultaneously with said locking bolt.

3. The combination of an ignition circuit switch, an electric starter switch embodying a key hole and a key insertible therein, a steering shaft latch bar, and manually controlled means for opening the ignition switch, barring the key hole of the starter switch and forcing the latch bar into engagement with the steering shaft.

In testimony whereof I affix my signature in presence of two witnesses.

HENRY W. BEECHER.

Witnesses:
　GEORGE W. HARRIS,
　M. E. BATE.